US008934332B2

(12) United States Patent
Fuhs et al.

(10) Patent No.: US 8,934,332 B2
(45) Date of Patent: Jan. 13, 2015

(54) MULTI-THREADED PACKET PROCESSING

(75) Inventors: Ronald E. Fuhs, Rochester, MN (US);
Scott M. Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/408,575

(22) Filed: Feb. 29, 2012

(65) Prior Publication Data
US 2013/0223234 A1    Aug. 29, 2013

(51) Int. Cl.
| G06F 11/00 | (2006.01) |
| G01R 31/08 | (2006.01) |
| H04L 12/24 | (2006.01) |
| G06F 3/00  | (2006.01) |
| G06F 15/00 | (2006.01) |
| G06F 7/38  | (2006.01) |

(52) U.S. Cl.
USPC ............. 370/216; 370/242; 370/394; 710/20; 712/16; 712/225; 714/2

(58) Field of Classification Search
CPC ...... H04L 47/34; H04L 1/1841; H04L 49/309
USPC .................. 370/392, 394, 216, 242; 709/250; 710/20; 712/16, 225; 714/2
See application file for complete search history.

(56) References Cited

U.S. PATENT DOCUMENTS

| 5,664,200 | A  | * | 9/1997  | Barlow et al. ................. 710/268 |
| 7,698,304 | B2 | * | 4/2010  | Collacott et al. ............. 709/203 |
| 7,751,401 | B2 | * | 7/2010  | Johnson et al. ............... 370/392 |
| 7,779,132 | B1 | * | 8/2010  | Chu et al. ...................... 709/227 |
| 7,949,792 | B2 | * | 5/2011  | Kujk et al. .................... 709/250 |
| 8,028,071 | B1 | * | 9/2011  | Mahalingam et al. ........ 709/227 |
| 2003/0235194 | A1 |  | 12/2003 | Morrison |
| 2005/0060538 | A1 |  | 3/2005  | Beverly |
| 2008/0263282 | A1 | * | 10/2008 | Harada et al. ................. 711/129 |
| 2010/0067578 | A1 | * | 3/2010  | Nakagawa ............... 375/240.13 |

(Continued)

FOREIGN PATENT DOCUMENTS

| CN | 1520112 A     | 8/2004 |
| CN | 1910869 A     | 2/2007 |
| WO | 2005053199 A2 | 6/2005 |

OTHER PUBLICATIONS

International Search Report and Written Opinion of the ISA dated Jul. 11, 2013—International Application No. PCT/IB2013/051223.

Primary Examiner — Alpus H Hsu
Assistant Examiner — Anthony Luo
(74) Attorney, Agent, or Firm — Edward J. Wixted, III; Jason Sosa

(57) ABSTRACT

A system is disclosed for concurrently processing order sensitive data packets. A first data packet from a plurality of sequentially ordered data packets is directed to a first offload engine. A second data packet from the plurality of sequentially ordered data packets is directed to a second offload engine, wherein the second data packet is sequentially subsequent to the first data packet. The second offload engine receives information from the first offload engine, wherein the information reflects that the first offload engine is processing the first data packet. Based on the information received at the second offload engine, the second offload engine processes the second data packet so that critical events in the processing of the first data packet by the first offload engine occur prior to critical events in the processing of the second data packet by the second offload engine.

22 Claims, 4 Drawing Sheets

(56) References Cited

U.S. PATENT DOCUMENTS

| | | | |
|---|---|---|---|
| 2011/0153940 A1* | 6/2011 | Lee | 711/118 |
| 2012/0008631 A1 | 1/2012 | Hass | |
| 2012/0278517 A1* | 11/2012 | Korger | 710/53 |

\* cited by examiner

MULTI-THREADED PACKET PROCESSING

FIELD OF THE INVENTION

The present invention relates generally to computer networking and more particularly to multi-threading received packets utilizing multiple packet processing engines.

BACKGROUND OF THE INVENTION

High-performance networking is continually faced with a challenge: local networking technologies are getting faster more quickly than processor and memory speeds. Every time that Ethernet technology provides another speed increment, networking developers must find ways to enable the rest of the system to keep up—even on fast contemporary hardware.

Networking devices typically utilize a buffer, i.e., a region of memory that temporarily stores data in the networking device, to compensate for congestion at an incoming (or outgoing) port on a concentrator, multiplexer, switch, router, etc. If, for example, the level of incoming traffic exceeds the resources of a switch, a buffer at the incoming switch port can temporarily store the excess traffic until the switch has sufficient resources to process the traffic. A buffer can also serve to store packet data temporarily to allow retransmission in the event that a downstream device does not receive the packet without error within an acceptable period of time.

Network interface hardware of a receiving computer system typically receives packets into a buffer before the packet contents are written to system memory. As processing overhead becomes significant, to reduce the chance of buffer overflow, packets in the buffer may be sent to one or more offload engines for processing and writing into memory. The one or more offload engines often provide features such as parsing packet headers, checksum calculations, header separation, and scatter-gather storing of the packets.

Multiple offload engines may be employed to concurrently handle packets from different logical ports, threads, or other connections. In such a system, packet processing may be referred to as "multi-threaded."

SUMMARY

Aspects of an embodiment of the present invention disclose a method and system for concurrently processing order sensitive data packets. A plurality of sequentially ordered data packets are received into a network interface device. The network interface device directs a first data packet from the plurality of sequentially ordered data packets to a first offload engine. The network interface device directs a second data packet from the plurality of sequentially ordered data packets to a second offload engine, wherein the second data packet is sequentially subsequent to the first data packet. The second offload engine receives information from the first offload engine, wherein the information reflects that the first offload engine is processing the first data packet. Based on the information received at the second offload engine, the second offload engine processes the second data packet so that critical events in the processing of the first data packet by the first offload engine occur prior to critical events in the processing of the second data packet by the second offload engine.

DETAILED DESCRIPTION

Figure 1:
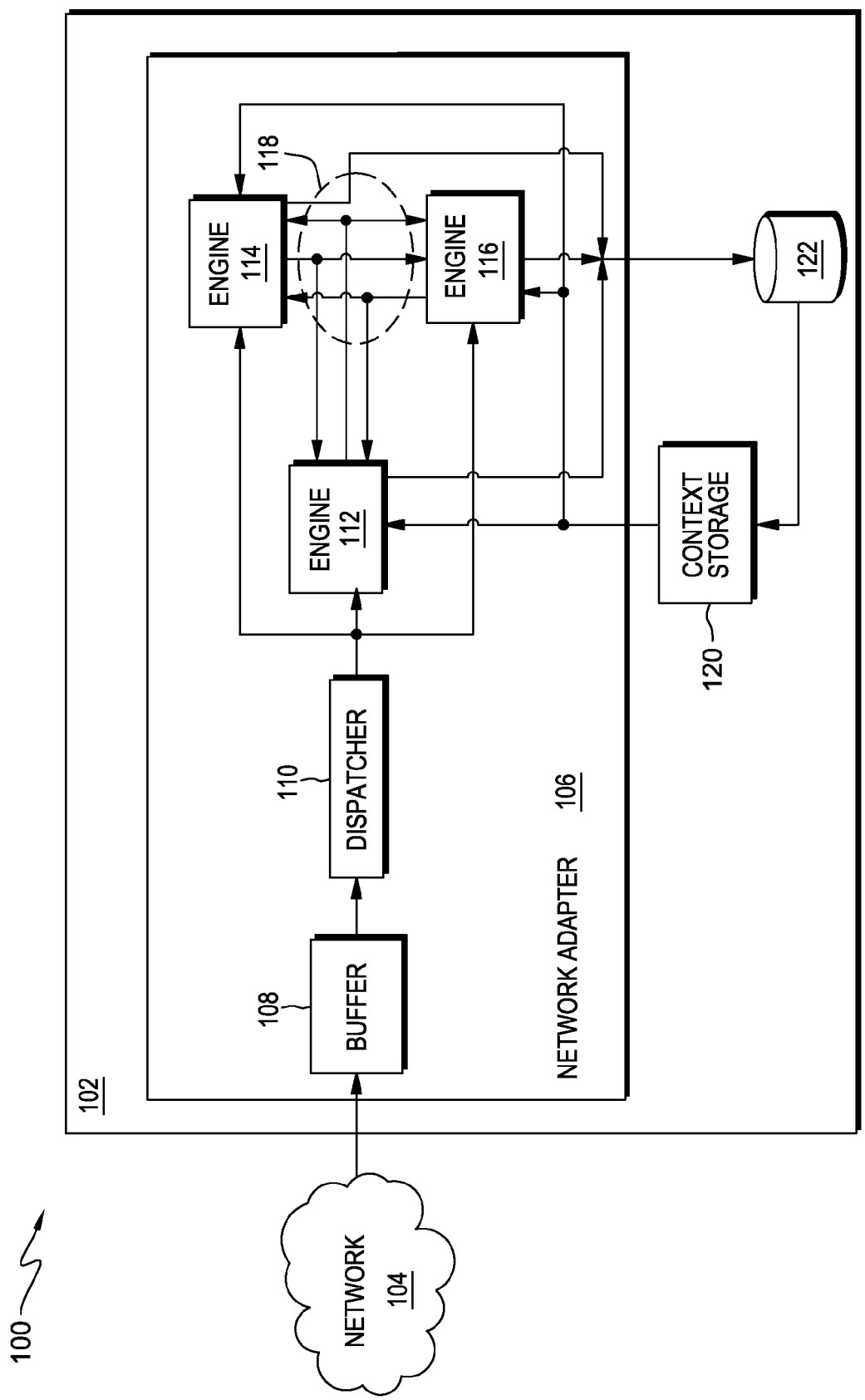
FIG. 1 illustrates a networked data processing system, in accordance with an illustrative embodiment of the present invention.

The present invention will now be described in detail with reference to the Figures. FIG. 1 illustrates a networked data processing system, generally designated 100, according to one embodiment of the present invention. Data processing system 100 comprises computer system 102 connected to network 104. Network 104 represents a collection of computers and devices interconnected by communications channels that facilitate communications and resource sharing between the interconnected computers and devices. The communications channels may include wire, wireless communication links, or fiber optic cables. Computer system 102 may be any computing device such as a server computer, a client computer, a notebook, a laptop computer, a tablet computer, a handheld device or smart-phone, a thin client, router, hub, or any other electronic device or computing system capable of communicating with another computing device through a network.

Network adapter 106 allows computer system 102 to communicate over network 104. In another embodiment, any network interface device may be used. Network adapter 106 receives incoming data packets into buffer 108. As packets arrive, dispatcher 110 assigns each packet to one of packet processing engines 112, 114, or 116. Dispatcher 110 is a component of network adapter 106 which comprises control logic to determine when a packet processing engine becomes available and direct the next packet in buffer 108 to the available engine. Each of packet processing engines 112, 114, and 116 is an offload engine, preferably on network adapter 106, comprising control logic to process a received data packet and write information from the data packet into system memory. Control logic is a sequence of steps required to perform a specific function, and, in the preferred embodiment, is implemented through firmware, typically hardwired computer circuits and other hardware or, alternatively, low-level program instructions stored on a read only memory (ROM) and executed by one or more control circuits.

Embodiments of the present invention recognize the difficulty of multi-threaded packet processing in preserving the order of received packets where it is desirable to do so, e.g., when packets are received from the same logical port, thread, or connection. Interface 118 provides a communications interface between packet processing engines 112, 114, and 116, allowing for parallel processing of order sensitive data packets. In the depicted embodiment, output ports of each of packet processing engines 112, 114, and 116 connect to input ports of each of the other packet processing engines from engines 112, 114, and 116. In an alternate embodiment, interface 118 may limit communications to some subset of all packet processing engines. A person of ordinary skill in the art will recognize that, in various embodiments, computer system 102 may contain any number of packet processing engines. Interface 118 may be utilized to communicate sequence and status of packets from the same logical port, thread, or connection being processed by multiple processing engines so that parallel processing may be employed and order maintained.

When a packet processing engine processes a data packet, the processing engine does so in light of a set of interrelated conditions directing how the processing is handled, i.e., contextual information. For example, the processing engine may require the location in memory to which it will write the information in the data packet after processing. Similarly, the processing engine may require system permissions for data packets of a certain type, or may benefit from an order in a sequence of data packets received for a specific thread. Computer system 102 accumulates such context information in a context storage facility, e.g., cache memory, and the processing engine may receive the context information from the context storage facility.

In the preferred embodiment, as data packets are received at computer system 102, lists of memory buffers in system memory are allocated to receive the data packets. Pointers into each list of memory buffers and a count of available buffers in each list are added to context storage 120. Context storage 120 may maintain the current state of pointers and the count. As a data packet for a specific thread is received, context storage may communicate the current position of a pointer into memory allocated for the specific thread, to the packet processing engine which is processing the data packet, and may communicate the count of available buffers. Additionally, in various embodiments, context storage 120 may also communicate other contextual information, e.g., permissions, to the packet processing engine. When packet processing engine 112, 114, or 116 has completed processing a data packet, the information from the data packet is written into system memory 122 at the location specified by the pointer. Subsequently, the pointer is moved to the next available buffer in the list, and the updated pointer location and any new count are updated in context storage 120.

In a preferred embodiment of the present invention, a packet processing engine that is the first to begin processing a data packet for a logical port, thread, or connection is considered the primary processing engine, and receives context information from context storage 120. A packet processing engine that is assigned a data packet while another packet processing engine is already processing a data packet for the same logical port, thread, or connection is considered a secondary processing engine. A secondary processing engine receives context information (status of the primary processing engine, permissions, a predicted pointer position) from the primary processing engine via interface 118. The secondary processing engine does not write into memory until notice is received that the primary processing engine has written into memory.

Figure 2:
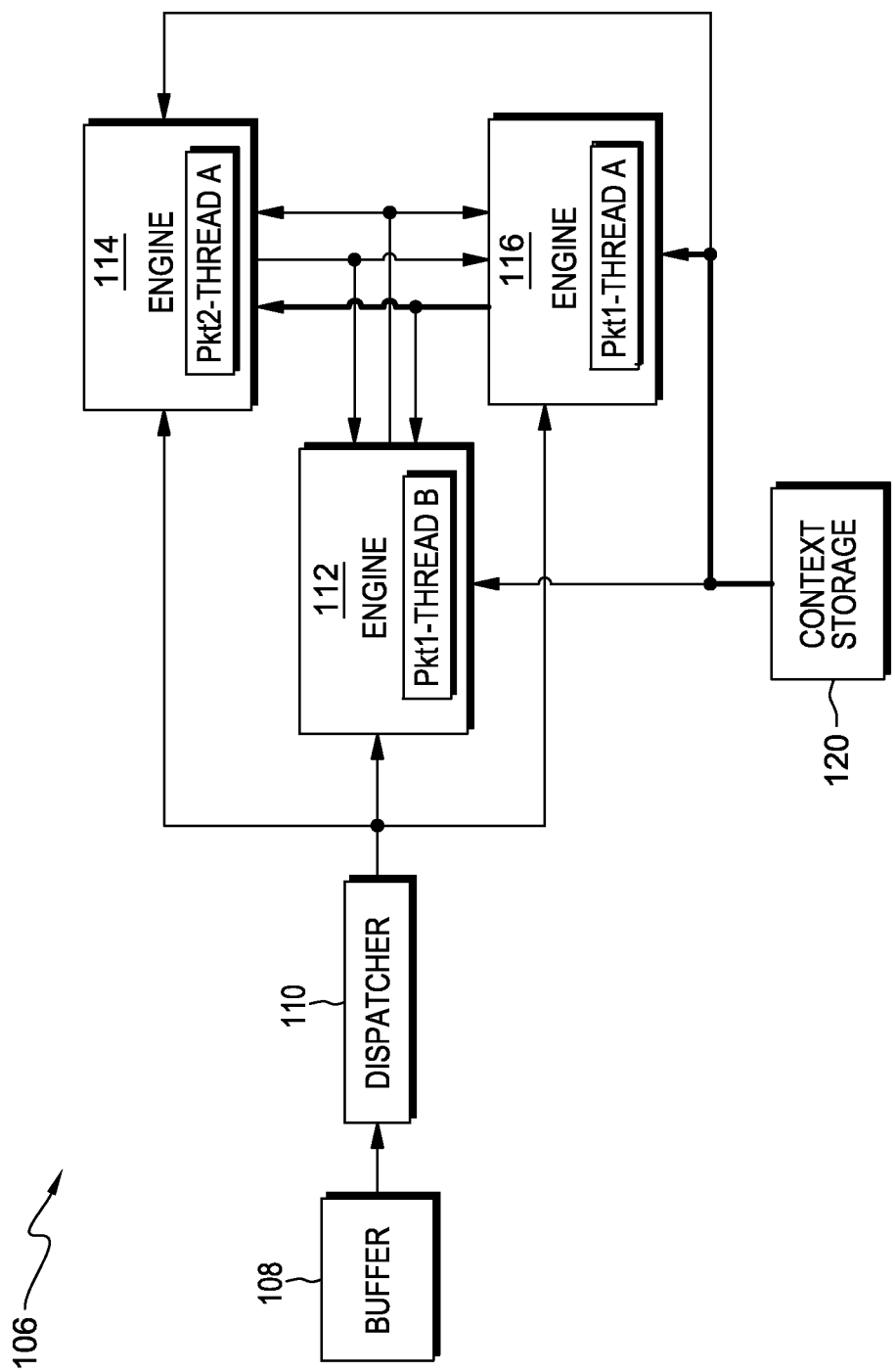
FIG. 2 depicts an exemplary scenario of data packets being processed by components of a network adapter, in accordance with an exemplary embodiment.

FIG. 2 depicts an exemplary scenario of data packets being processed by components of network adapter 106, in accordance with an illustrative embodiment.

Packet 1 of thread A, packet 1 of thread B, and packet 2 of thread A are received at buffer 108, which is implemented as a first-in first-out (FIFO) queue. Dispatcher 110 finds the next available packet processing engine, depicted here as processing engine 116, and directs packet 1 of thread A to be processed by processing engine 116. As packet 1 of thread A is the first packet of thread A to be processed, processing engine 116 is a primary processing engine and reads in at least a pointer into a list of memory for the thread A from context storage 120 (the connection is depicted in bold).

Dispatcher 110 assigns the next data packet, packet 1 of thread B, to the next available packet processing engine, here depicted as processing engine 112. No other packet processing engines are processing data packets from thread B, so processing engine 112 is also a primary processing engine, and reads in at least a pointer into a list of memory for thread B from context storage 120.

Finally, dispatcher 110 assigns packet 2 of thread A to processing engine 114. Because packet 1 of thread A is concurrently being processed by processing engine 116, processing engine 114 is a secondary processing engine. Processing engine 116, acting as the primary processing engine, predicts the location of the pointer into the memory list for thread A for the next sequential packet based on the size of the data packet currently being processed by processing engine 116. Context information, including at least the predicted location of the pointer into memory, is placed on processing engine 116's output ports. Processing engine 114, as the secondary processing engine, reads context information from the primary processing engine, processing engine 116, instead of context storage 120 (the connection is depicted in bold). Processing engine 116 may also output status updates so that secondary processing engines can determine how far they may proceed in processing their own data packet.

Figure 3:
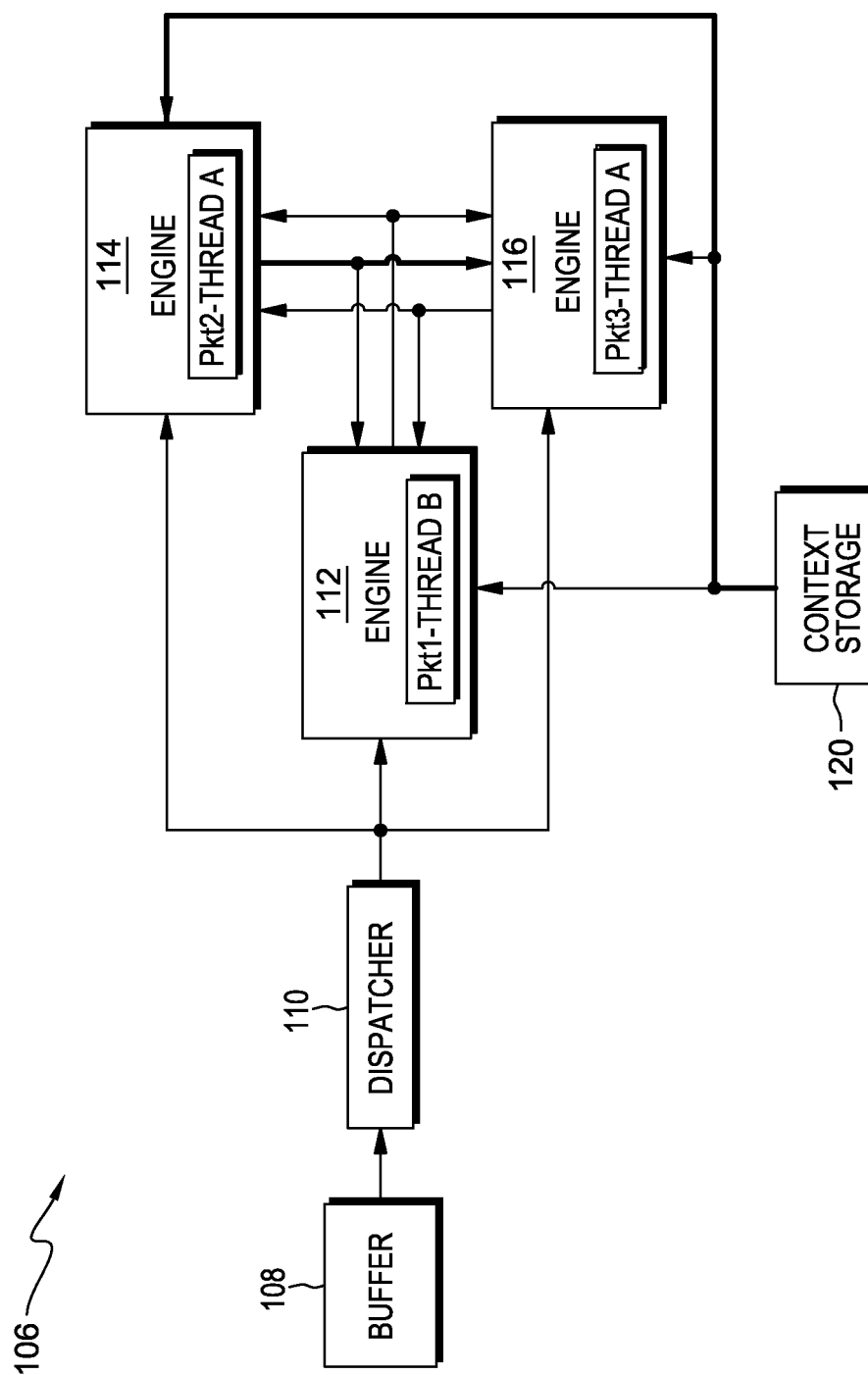
FIG. 3 illustrates a subsequent state of the processing sequence described in FIG. 2.

FIG. 3 illustrates a subsequent state of the processing sequence described in FIG. 2. After processing engine 116 has completed processing packet 1 of thread A, processing engine 114 becomes the new primary engine. Dispatcher 110 assigns another packet received by buffer 108, packet 3 of thread A, to the now available processing engine 116. Processing engine 116 is now a secondary processing engine to processing engine 114. Processing engine 114 predicts context information for the next sequential packet, e.g., where the pointer into memory will point when packet 2 of thread A has finished processing, and places the context information on an output port accessible to processing engine 116.

Figure 4:
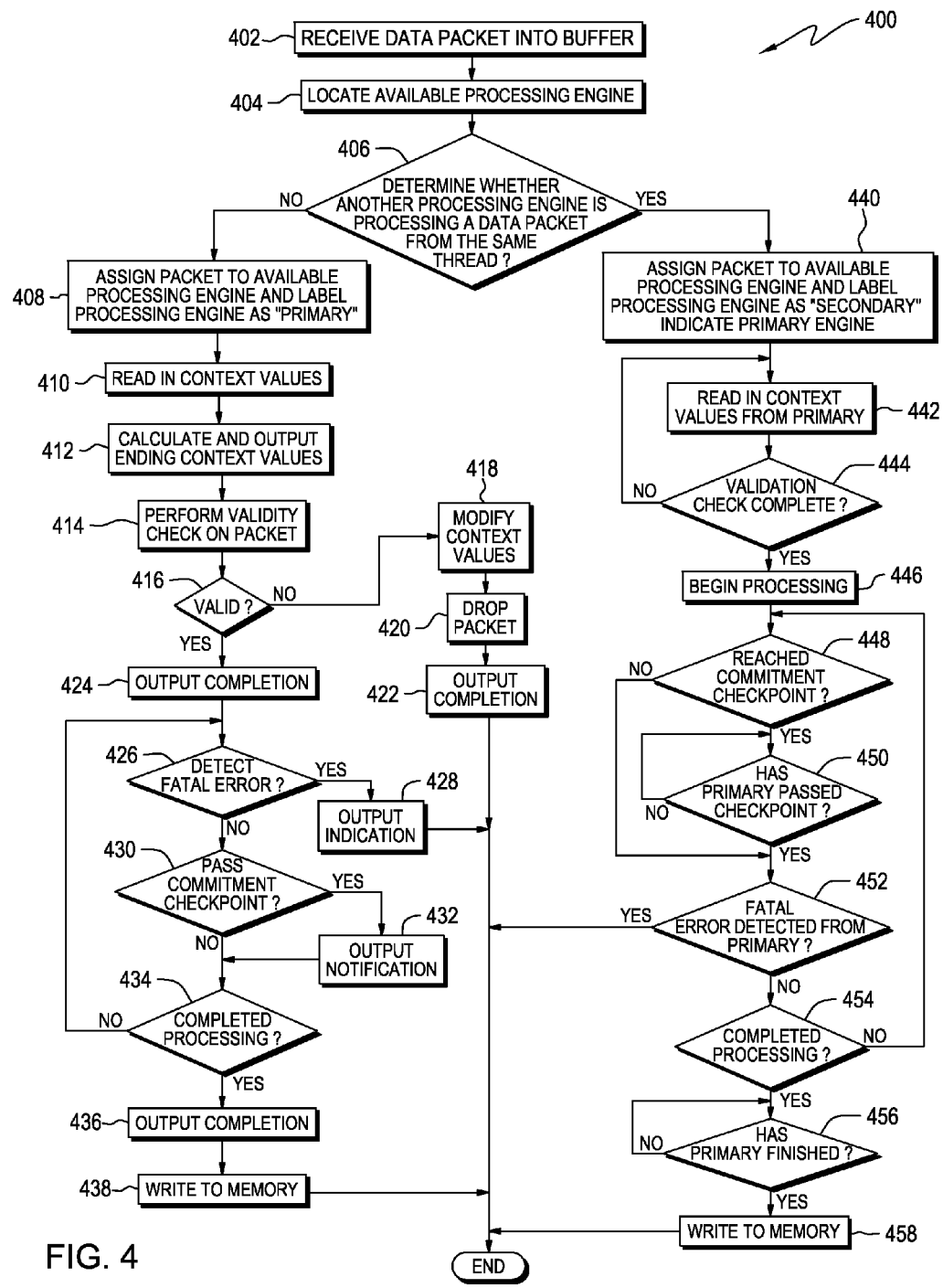
FIG. 4 depicts a more detailed logic flow for multi-threaded processing of order sensitive data packets, in accordance with an illustrative embodiment.

FIG. 4 depicts a more detailed logic flow (control logic 400) for multi-threaded processing of order-specific data packets, in accordance with an illustrative embodiment.

Control logic 400 receives a data packet into a buffer (step 402) and locates available processing engines (step 404) that the data packet can be offloaded to. In step 406, control logic 400 determines whether another processing engine is processing a data packet from the same thread (or other logical connection requiring order-specificity between the data packets) (decision 406).

Responsive to determining that there is no other data packet from the same thread being processed (no branch of decision 406), control logic 400 assigns the data packet to the available processing engine, and labels or designates the processing engine as a primary processing engine (step 408). In one embodiment, a flag value is passed to the processing engine indicating that it is a primary processing engine. In a second embodiment, an address may be passed to the processing engine from which context information may be read, the address being that of a context storage facility containing, for example, pointers into memory allocated for received data, a current count of items in the allocated memory, sequence order, various permissions, etc. (e.g., context storage 120).

In step 410, control logic 400 reads context values into the processing engine from the context storage facility and may begin processing the data packet. Control logic 400 calculates and outputs context values for a subsequent sequential data packet (step 412). For example, based on the size of the data packet being processed, control logic 400 may predict where the pointer into memory will point subsequent to writing the data packet into memory. The predicted pointer value may be put on one or more output ports of the processing engine. Additionally, the processing engine may output the next sequential data packet that should be processed, various permissions, and a current status of its own processing sequence.

Control logic 400 performs a validity check of the data packet in the processing engine (step 414). Typically, errors in the data packet result in the data packet being dropped and processing to continue with the next data packet. The processing engine performs one or more validity tests, for example, by calculating a checksum, and determines whether errors exist in the data packet (decision 416).

If it is determined that the data packet is not valid (no branch of decision 416), control logic 400 modifies the context values outputted by the processing engine (step 418) to indicate the correct values given the packet drop that will occur. For example, the pointer into memory will not be advanced for the next data packet. Subsequent to modifying the context values, control logic 400 drops the data packet (step 420) and outputs an indication that the processing engine has completed its validity check (step 422) so that subsequent data packets may be processed.

If, on the other hand, it is determined that the data packet is valid (yes branch of decision 416), control logic 400 outputs an indication that the processing engine has completed its validity check (step 424) so that a subsequent sequential data packet can be processed based on the original calculated context values (from step 412).

Subsequent to the validity check, control logic 400 determines whether the processing engine incurred a fatal error (decision 426). If a fatal error is detected (yes branch of decision 426), the processing engine outputs an indication of the fatal error (step 428). If no fatal error is detected (no branch of decision 426), control logic 400 determines whether the processing of the data packet has passed a commitment checkpoint (decision 430). At certain points in the packet processing, a secondary processing engine processing a subsequent data packet cannot perform certain actions until the primary processing engine has completed the same action. For example, during the course of processing a data packet, a processing engine may have to send an interrupt to various software components. This action may need to be completed by a primary processing engine prior to a secondary processing engine sending the interrupt. As another example, processing engines update the context storage facility when processing a data packet. The context storage facility should be updated by a processing engine that processed a first data packet before the context storage facility is updated by a processing engine processing a subsequent second data packet.

If control logic 400 determines that such a checkpoint has been passed (yes branch of decision 430), control logic 400 outputs a notification of the passed checkpoint from the processing engine (step 432). Subsequent to outputting the notification in step 432, or alternatively, subsequent to determining that a checkpoint has not been passed (no branch of decision 430), control logic 400 determines whether the processing engine has completed processing the data packet (decision 434). If the processing engine has not finished processing the data packet (no branch of decision 434), the processing engine continues to process the data packet while iteratively cycling through steps 426-434 to determine whether a fatal error has been detected, whether any checkpoints have been completed, and whether the processing engine has completed processing of the data packet.

If the processing engine has completed processing the data packet (yes branch of decision 434), control logic 400 outputs an indication of the completion from the processing engine (step 436), and writes the information of the data packet into memory (step 438) utilizing, in a preferred embodiment, the pointer into memory passed to the processing engine from the context storage facility.

Referring back to decision 406, if it is determined that another processing engine is processing a data packet of same thread (yes branch of decision 406), control logic 400 assigns the data packet to the available processing engine, labels or designates the processing engine as secondary, and indicates the primary processing engine (step 440). In one embodiment, a flag value is passed to the processing engine indicating that it is a secondary processing engine. In a second embodiment an address is passed from which to read context information, the address being that of one or more outputs of the primary processing engine. In such an embodiment, the address being passed may act to designate the processing engine as secondary and indicate the primary processing engine.

Control logic 400 reads context values into the secondary processing engine from the primary processing engine (step 442). The context values may include sequence information, a calculated or predicted memory pointer location, various permissions, status of the primary processing engine, etc. Based on the received context values, control logic 400 determines whether a validation check has been completed by the primary processing engine for the data packet being processed by the primary processing engine (decision 444).

If a validation check has not yet been completed by the primary processing engine (no branch of decision 444), the secondary processing engine will not begin processing its own data packet and will continue to read in values from the primary processing engine until it receives an indication that the check has been completed. If the validation check has been completed (yes branch of decision 444), control logic 400 begins processing of the data packet in the secondary processing engine (step 446).

Control logic 400 determines whether a commitment checkpoint has been reached (decision 448) where the secondary processing engine cannot perform an action or continue processing the data packet before the primary processing engine has passed a corresponding checkpoint. If such a checkpoint has been reached (yes branch of decision 448), control logic 400 determines whether the primary processing engine has passed the checkpoint (decision 450). If the primary processing engine has not passed the checkpoint (no branch of decision 450), processing does not proceed and control logic 400 continues to check for the primary processing engine to pass the checkpoint. If the primary processing engine has passed the commitment checkpoint (yes branch of decision 450), or alternatively, if no checkpoint was reached (no branch of decision 448), control logic 400 determines whether any fatal errors from the primary processing engine have been detected (decision 452).

If the secondary processing engine does receive an indication that a fatal error was detected by the primary processing engine (yes branch of decision 452), the secondary processing engine silently terminates processing of its own data packet by not notifying any software and not storing context back to the context storage facility. If no indication of a fatal error has been received (no branch of decision 452), control logic 400 determines whether the secondary processing engine has completed processing of the data packet (decision 454).

If the secondary processing engine has not completed processing the data packet (no branch of decision 454), the secondary processing engine continues to process the data packet while iteratively cycling through steps 448 - 454 to determine whether the primary processing engine has passed any checkpoints reached by the secondary processing engine, whether a fatal error has been detected in the primary processing engine, and whether the secondary processing engine has completed processing of the data packet.

If the secondary processing engine has completed processing the data packet (yes branch of decision 454), control logic 400 determines whether the primary processing engine has finished processing its own data packet (decision 456), and if not (no branch of decision 456) waits for the primary processing engine to complete its processing. If the primary processing engine has finished (yes branch of decision 456), control logic 400 writes the information from the data packet being processed by the secondary processing engine to memory (step 458) utilizing, in a preferred embodiment, the pointer into memory passed to the secondary processing engine from the primary processing engine.

Based on the foregoing, a method and system have been disclosed for performing multi-threaded processing on order sensitive data packets. However, numerous modifications and substitutions can be made without deviating from the scope of the present invention. In this regard, each block in the flowcharts or block diagrams may represent a module, segment, or portion of control logic for implementing the specified logical function(s). It should also be noted that, in some alternative implementations, the functions noted in the blocks may occur out of the order noted in the figures. Therefore, the present invention has been disclosed by way of example and not limitation.

What is claimed is:

1. A method for concurrently processing order sensitive data packets, the method comprising the steps of:
   receiving a plurality of sequentially ordered data packets into a network interface device;
   the network interface device directing a first data packet from the plurality of sequentially ordered data packets to a first offload engine;
   the network interface device directing a second data packet from the plurality of sequentially ordered data packets to a second offload engine, wherein the second data packet is sequentially subsequent to the first data packet;
   the first offload engine, acting as primary offload engine, predicting a location of a pointer into memory based on a size of the first data packet being processed by the first offload engine and outputting context information;
   the second offload engine receiving the context information from the first offload engine, wherein the context information comprises at least a sequence number, an indication of status of processing the first data packet by the first offload engine, and the predicted location of the pointer into memory based on the size of the first data packet being processed by the first offload engine; and
   based on the context information received at the second offload engine, the second offload engine processing the second data packet so that critical events in the processing of the first data packet by the first offload engine occur prior to critical events in the processing of the second data packet by the second offload engine.

2. The method of claim 1, wherein the context information received from the first offload engine includes whether the first offload engine has completed a validity check on the first data packet, whether a checkpoint in processing has been reached, whether processing of the first data packet has been completed, or a combination of the preceding.

3. The method of claim 1, wherein the critical events in the processing of the first and second data packets include: beginning to process the respective first or second data packet, completing a validity check, passing checkpoints in processing, and writing the respective first or second data packet into memory.

4. The method of claim 3, wherein the checkpoints in processing comprise one or more of the following: sending an interrupt to a software component and updating a context storage facility.

5. The method of claim 1, wherein the step of the second offload engine processing the second data packet so that critical events in the processing of the first data packet by the first offload engine occur prior to critical events in the processing of the second data packet by the second offload engine comprises one or more of the following steps:
   the second offload engine beginning to process the second data packet subsequent to receiving a notification from the first offload engine that a validity check has been completed on the first data packet;
   the second offload engine continuing to process the second data packet past a checkpoint in processing subsequent to receiving a notification from the first offload engine that the first offload engine has passed a corresponding checkpoint in processing the first data packet; and
   the second offload engine writing the second data packet into memory subsequent to a notification that the first offload engine has written the first data packet into memory.

6. The method of claim 1, wherein the context information received from the first offload engine comprises a notification of a fatal error occurring in the processing of the first data packet, and responsive to receiving the notification of the fatal error occurring, the second offload engine dropping the second data packet.

7. The method of claim 1, further comprising the steps of:
   the first offload engine determining that the first data packet does not pass a validity test and, in response, recalculating the predicted location of a pointer into memory for the second data packet;
   the first offload engine outputting the recalculated predicted location; and
   the first offload engine dropping the first data packet.

8. The method of claim 1, further comprising the steps of:
   the first offload engine determining that a fatal error has occurred during processing of the first data packet; and
   the first offload engine outputting a notification of the fatal error.

9. The method of claim 1, further comprising the steps of:
   the first offload engine completing processing of the first data packet;
   the first offload engine outputting a notification that the first data packet has been processed; and
   the first offload engine writing information from the first data packet into memory.

10. The method of claim 1, wherein the first and second data packets are from the same thread.

11. The method of claim 1, further comprising:
    receiving a third data packet into the network interface device, wherein the third data packet is not from the plurality of sequentially ordered data packets;
    the network interface device directing the third data packet to a third offload engine;
    the first offload engine receiving context information from a context storage facility, wherein the context information comprises at least a current position of a pointer into memory allocated for the plurality of sequentially ordered data packets; and
    the third offload engine receiving context information from the context storage facility, wherein the information comprises at least a current position of a pointer into memory allocated for the third data packet.

12. A system for concurrently processing order sensitive data packets, the system comprising:
   a buffer to receive data packets via a network connection;
   a plurality of offload engines which can be assigned data packets from the buffer, each of the plurality of offload engines capable of processing a data packet and storing information from a data packet into system memory;
   a communication interface between at least a first and second offload engine from the plurality of offload engines, wherein the communication interface allows for signals outputted at the first offload engine to be received by the second offload engine;
   wherein the system is operable to:
   receive a plurality of sequentially ordered data packets into the buffer;
   direct a first data packet from the plurality of sequentially ordered data packets to the first offload engine;
   direct a second data packet from the plurality of sequentially ordered data packets to the second offload engine, wherein the second data packet is sequentially subsequent to the first data packet;
   predict by the first offload engine, acting as primary offload engine, a location of a pointer into memory based on a size of the first data packet being processed by the first offload engine and output context information to the second offload engine;
   receive context information at the second offload engine from the first offload engine, wherein the context information comprises at least a sequence number, an indication of status of processing the first data packet by the first offload engine, and the predicted location of a pointer into memory based on the size of the first data packet being processed by the first offload engine; and
   based on the context information received at the second offload engine, process the second data packet at the second offload engine so that critical events in the processing of the first data packet by the first offload engine occur prior to critical events in the processing of the second data packet by the second offload engine.

13. The system of claim 12, wherein the context information received from the first offload engine includes whether the first offload engine has completed a validity check on the first data packet, whether a checkpoint in processing has been reached, whether processing of the first data packet has been completed, or a combination of the preceding.

14. The system of claim 12, wherein the critical events in the processing of the first and second data packets include: beginning to process the respective first or second data packet, completing a validity check, passing checkpoints in processing, and writing the respective first or second data packet into memory.

15. The system of claim 14, wherein the checkpoints in processing comprise one or more of the following: sending an interrupt to a software component and updating a context storage facility.

16. The system of claim 12, wherein the system being operable to process the second data packet by the second offload engine so that critical events in the processing of the first data packet by the first offload engine occur prior to critical events in the processing of the second data packet by the second offload engine comprises the system being operable to:
   begin to process the second data packet at the second offload engine subsequent to receiving a notification from the first offload engine that a validity check has been completed on the first data packet;
   continue to process the second data packet at the second offload engine past a checkpoint in processing subsequent to receiving a notification from the first offload engine that the first offload engine has passed a corresponding checkpoint in processing the first data packet; and
   write the second data packet into memory subsequent to a notification at the second offload engine that the first offload engine has written the first data packet into memory.

17. The system of claim 12, wherein the context information received from the first offload engine comprises a notification of a fatal error occurring in the processing of the first data packet, and responsive to receiving the notification of the fatal error occurring, the system is operable to drop the second data packet.

18. The system of claim 12, wherein the system is further operable to:
   determine at the first offload engine that the first data packet does not pass a validity test and, in response, recalculate a predicted location of a pointer into memory for the second data packet;
   output, at the first offload engine, the recalculated predicted location; and
   drop the first data packet.

19. The system of claim 12, wherein the system is further operable to:
   determine that a fatal error has occurred during processing of the first data packet; and
   output, at the first offload engine, a notification of the fatal error.

20. The system of claim 12, wherein the system is further operable to:
   complete processing of the first data packet at the first offload engine;
   output, at the first offload engine, a notification that the first data packet has been processed; and
   write information from the first data packet into system memory.

21. The system of claim 12, wherein the first and second data packets are from the same thread.

22. The system of claim 12, wherein the system is further operable to:
   receive a third data packet into the network interface device, wherein the third data packet is not from the plurality of sequentially ordered data packets;
   direct the third data packet to a third offload engine;
   receive context information at the first offload engine from a context storage facility, wherein the context information comprises at least a current position of a pointer into memory allocated for the plurality of sequentially ordered data packets; and
   receive context information at the third offload engine from the context storage facility, wherein the context information comprises at least a current position of a pointer into memory allocated for the third data packet.

* * * * *